UNITED STATES PATENT OFFICE.

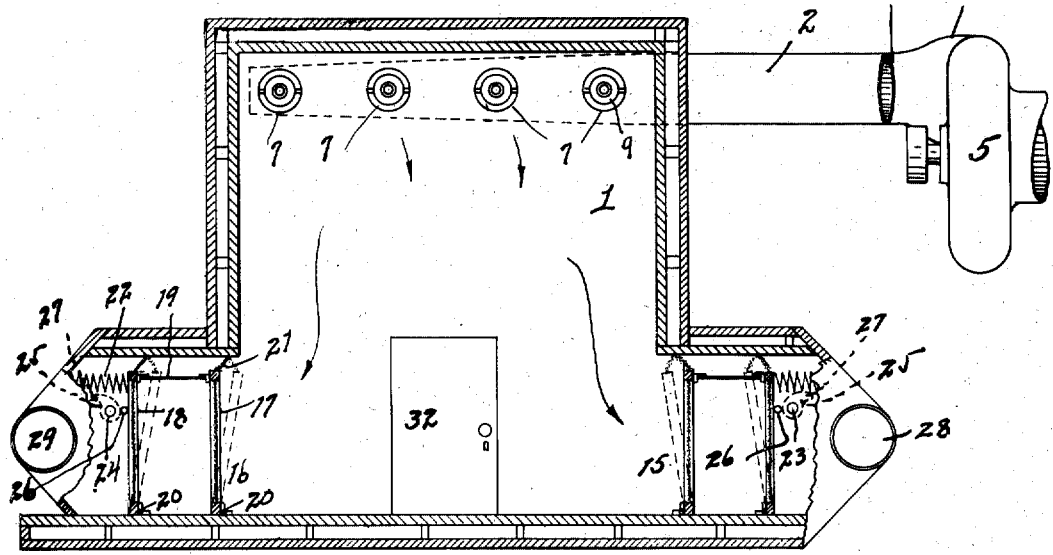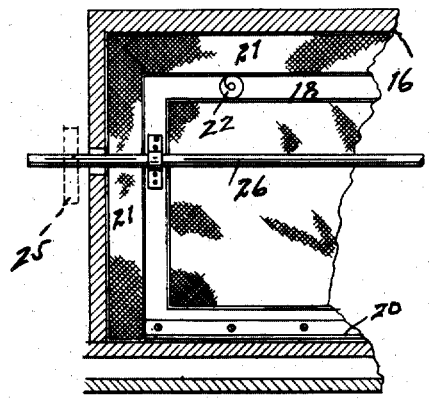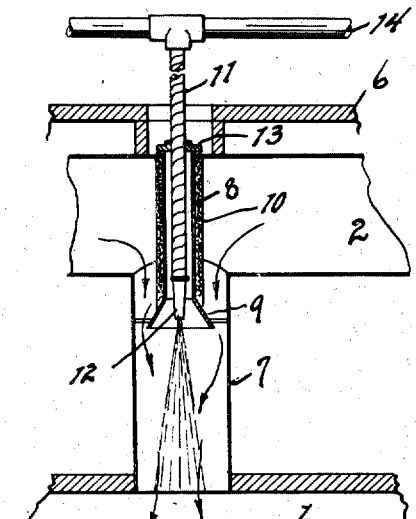

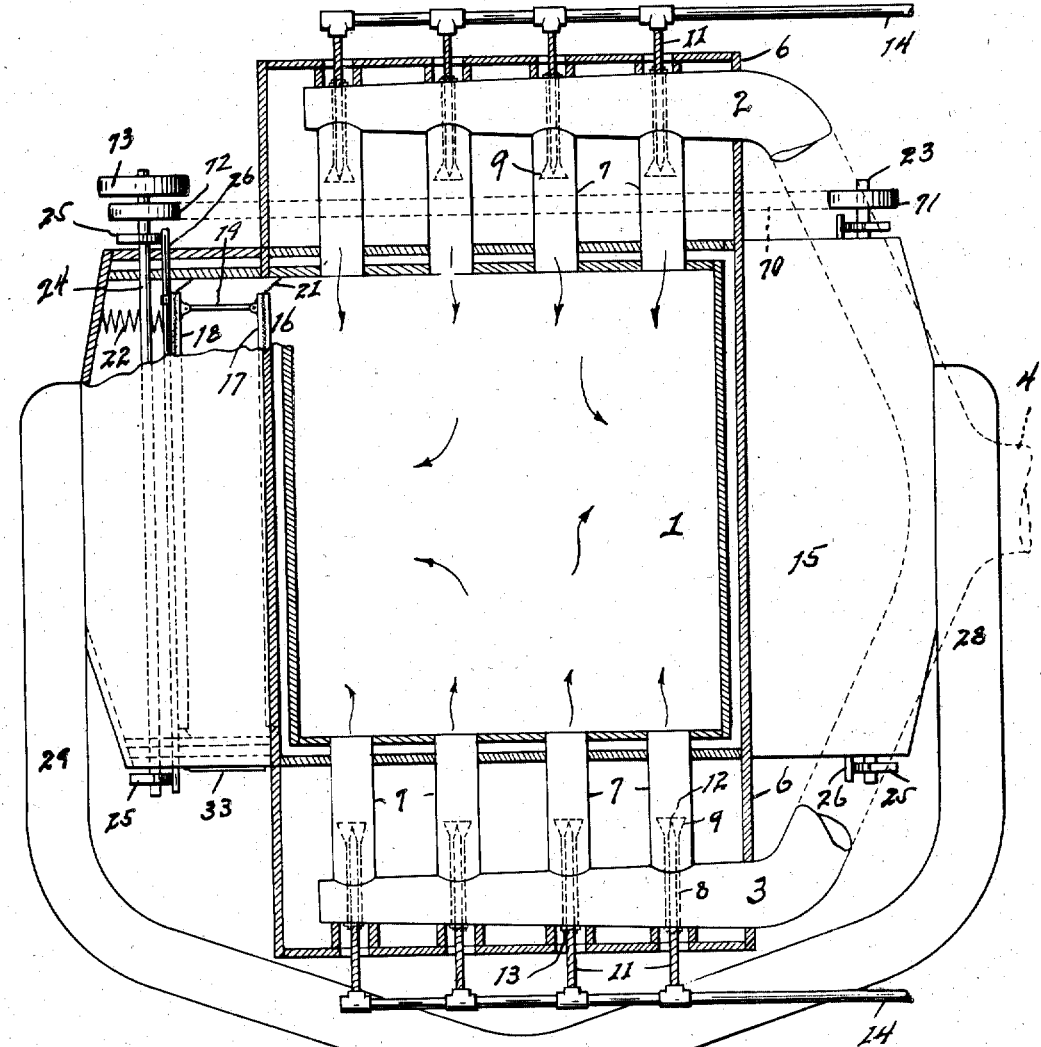

CHARLES E. ROGERS, OF DETROIT, MICHIGAN.

DESICCATING APPARATUS.

1,226,011. Specification of Letters Patent. Patented May 15, 1917.

Application filed October 18, 1913. Serial No. 796,043.

*To all whom it may concern:*

Be it known that I, CHARLES E. ROGERS, a citizen of the United States, residing at Detroit, county of Wayne, State of Michigan, have invented a certain new and useful Improvement in Desiccating Apparatus, and declare the following to be a full, clear, and exact description of the same, such as will enable others skilled in the art to which it pertains to make and use the same, reference being had to the accompanying drawings, which form a part of this specification.

This invention relates to apparatus for desiccating liquid, or semi-liquid, animal or vegetable matter, and an object of the invention is a means whereby the constituent solids of such matter may be rapidly and practically completely recovered in the form of a substantially dry powder, without altering their physical or chemical structure.

A further object is an apparatus for the purpose by means of which a much greater volume of fluid may be reduced to a powder form in practically the same period of time, and at a cost not materially greater than with present known methods and apparatus thus reducing the cost of production to a minimum.

Other novel features reside in the manner and means of atomizing the liquid in a rapidly flowing current of hot air under pressure and in the manner and means of separating the powder from the air. These and other objects and novel features of the invention are hereinafter more fully described and claimed and shown in the accompanying drawings in which—

Figure 1 is a vertical section of a device somewhat diagrammatic in form, illustrative of the manner and a means by which my invention may be practised.

Fig. 2 is a plan view partly in section of such device.

Fig. 3 is a detail of one of the spraying devices and its arrangement in the hot air conduit.

Fig. 4 is a detail of one of the screens utilized in separating the dried powder from the air.

Similar characters refer to similar parts throughout the drawings and specification.

The device consists of a precipitating and separating chamber 1, the walls of which are preferably double and insulated. Situated upon two of the sides of the chamber and externally thereof are two inlet conduits 2 and 3, branching from a main conduit 4, which is connected with the outlet of a blower 5. The blower receives its air from a furnace (not shown in the drawings) where it is heated to the desired temperature and the heated air is delivered under pressure by the blower to the discharge conduits 2 and 3. These conduits should be properly insulated to prevent loss of heat, and the tapering ends thereof, as shown in Fig. 2, are preferably inclosed by a casing 6. Leading from the tapered portion of these inlet conduits are spray conduits 7, 7, etc., leading into the interior of the chamber 1.

As may be seen in Fig. 3, a tube 8 is provided for each conduit 7 extending from the outer surface of the tapered inlet conduit and terminating within the spray conduit 7, in a bell-shaped portion 9. The tube 8 should be provided with an insulating covering 10 to shield the interior from heat and within the tube is placed the fluid discharge pipe 11, provided with an atomizing nozzle 12 of the ordinary form used for this purpose. The tube 11 is preferably flexible whereby it may be readily withdrawn for the purpose of cleaning or other purpose, and is provided with a washer 13, or the like, so positioned on the tube that when the pipe 11 is inserted within the tube 8 the tube is closed to the outside air and the spray nozzle is properly positioned at or near the bell shaped terminal 9 of the tube 8.

Each spray conduit 7 is provided with flexible discharge tube 11, and the tubes 11 are connected to the feed pipes 14, 14, upon either side of the device leading from a source of supply (not shown).

As may be seen in Fig. 1, the spray conduits 7 are situated near the top of the separating chamber 1, and at the bottom the chamber is provided with the discharge chambers 15 and 16, which are substantially alike in all respects. These chambers 15 and 16 extend entirely across the bottom of the chamber 1 as may be seen in Fig. 2, and the opening thereinto is closed by a double screen 17 and 18, in each instance which are connected together by links 19 at the top. The screen may be of any approved material such as fine cloth, or very fine wire mesh, and each screen frame is pivotally connected at 20, 20, to the floor of the device so that the screens may swing as a unit as indicated by dotted lines in Fig. 1. Between both the upper horizontal edge of the screen frame and the vertical side members thereof and the wall of the outlet chamber is a screen 21 of such length as to allow the screen frames to swing upon their pivots. This screen 21 prevents the powder laden air from passing around the screen frames. The screens are held in the vertical position shown by full lines in Fig. 1, by means of coil-springs 22, a sufficient number of which are secured in spaced relation to the frame and the chamber wall to yieldably hold the screens in substantially perpendicular position.

Extending across each discharge chamber 15 and 16 respectively is a shaft 23 and 24, and near each end of the shaft, preferably, outside of the chamber, is a cam wheel 25, 25 against which the ends of a rod 26 rest, which rod extends preferably entirely across and attached to the screen frame 18. The ends of the rod 26 are held in engagement with the cams by the heretofore mentioned coil springs 22. As may be seen more clearly in Fig. 1, each cam is provided with a high point 27 and rotation of the shafts 23 and 24 rotates the cams thereon and slowly forces the screen frames 17 and 18 toward the inside of the chamber 1, and as the high point of the cam passes beneath the rods 26, the screen frames snap back to vertical position and jar the powder accumulated thereon to the floor. The shafts 23 and 24 may be made to rotate in unison by means of a belt 70 running on the pulleys 71 and 72 and power may be applied to one of the shafts through the medium of the drive pulleys 73.

Each of the exhaust chambers terminates in an exhaust conduit 28 and 29 respectively which are united at 30, and form the inlet to the exhaust fan 31, which is preferably of greater capacity than the blower supplying the inlet conduits 2 and 5.

The blower 5 is preferably of such capacity as to maintain the inflowing air in the conduits 2 and 3 at a pressure some ounces, at least, above atmospheric pressure. The fluid to be desiccated is fed through the pipes 14 to the spray nozzles 12 under considerable pressure, the spray nozzles 12 being provided with a small hole whereby the material in being forced therethrough, passes into the conduit 7 in the form of a very fine spray, and thus comes into contact with the heated air in such form that the particles are practically immediately dried. In passing from the conduit 7 into the separating chamber the air expands and loses its comparatively high velocity and the dried particles fall to the floor of the chamber. The movement of the air in the chamber is very slow in comparison to the movement of the air in the conduits, as the outlet chambers 15 and 16 are of very large capacity in comparison to the inlet conduits 2 and 3, and, while the outlet conduits 28 and 29 may not be of much greater capacity than the conduits 2 and 3, the air in passing through the screens has a very slow movement due to the extent of the screen surface. Therefore, particles that are still held in suspension in the air are separated from it much more completely and readily than if the exhaust current was rapid, which would tend to draw the floating particles through the fine mesh of the screen.

The powder that falls to the floor of the separating chamber may be removed in any approved manner through the door 32, or by means of automatic mechanism, if desired. Dried powder that may pass through the first screen 17 will be deposited upon the second screen 18 from which it is shaken to the floor of the outlet chamber and may be removed therefrom through a door 33 provided in each outlet chamber for such purpose.

As heretofore stated, solids or fluids of various natures may be precipitated in dry powder form by the described process and apparatus, but many fluids, such as milk or the like, should be condensed, prior to being sprayed into the hot air conduits, in order that the solids may be more quickly and easily dried. This prior condensing or evaporating in the case of milk should be performed at a temperature below the coagulating point of the albumen, and then sprayed into the air current having a temperature below the caramelizing point of the milk-sugar.

The pressure of air within the precipitating chamber 1 is preferably, but not necessarily, slightly below atmospheric pressure, while the pressure of the air in the inlet conduits 2 and 3 is preferably somewhat higher than atmospheric pressure. The heated air under pressure, in passing by the bell-mouth of the tube 8, not only almost instantaneously dries the finely divided spray but by reason of its speed of movement, carries the dried spray in finely divided form into the chamber 1, where the air immediately expands by reason of the air under pressure entering an area of lower pressure. This precipitates the powder to a large extent, and this expansion of the air also has a cooling effect upon the solids. The removal of the moisture and subsequent cooling effect are accomplished in such an instantaneous manner that a milk may be produced which has undergone no appreciable chemical change as the lactic acid is prevented from combining with the salts of the milk during the evaporation and concentration, and the particles of milk are in such form as to be readily soluble in water.

What I claim and desire to secure by Letters Patent of the United States is—

1. Desiccating apparatus comprising a chamber of comparatively large cubical content, main conduits adjacent opposite sides of the chamber, branch conduits leading from said main conduits into the chamber whereby air forced through one series of branch conduits flows into the chamber toward the branch conduits on the opposite side, means for producing a flow of heated air through the conduits, means for spraying fluid to be desiccated into each of the branch conduits, exhaust chambers at the bottom of said first named chamber upon opposite sides thereof, a screen between each of said exhaust chambers and the first named chamber, each of said screens having an area in excess of the combined cross-sectional area of the conduits, exhaust conduits in communication with said exhaust chambers, and means for withdrawing air through said exhaust conduits.

2. Desiccating apparatus comprising a chamber of comparatively large cubical content, main conduits adjacent opposite sides of the chamber, branch conduits leading from said main conduits into the chamber, means for producing a flow of heated air under pressure through the conduits, means for spraying fluid to be desiccated into each of the branch conduits in the direction of flow of the air therethrough, exhaust chambers at the bottom of said first named chamber upon opposite sides thereof, a pivotally mounted screen between each of said exhaust chambers and the first named chamber, each having an area in excess of the combined cross-sectional area of the conduits leading into any one side of the chamber, means for slowly forcing said screens out of normal position, means for returning the screens to normal position in such manner that the screen is sharply jarred or shaken, exhaust conduits in communication with said exhaust chambers, and means for withdrawing air through said exhaust conduits.

3. In a desiccating apparatus, a conduit for heated air, means for forcing heated air through the conduit, a tube in the conduit with the longitudinal axis thereof practically coinciding with the longitudinal axis of the conduit, and terminating in a bell-shaped portion at a distance from the discharge end of the conduit, a spray nozzle in said bell-shaped portion, a fluid supply pipe, and a flexible tube connecting the nozzle with the supply pipe, said bell-shaped nozzle being less in diameter than the conduit.

4. Desiccating apparatus comprising a chamber of comparatively large cubical content, a plurality of conduits leading thereinto upon opposite sides of the chamber, means for supplying each of the conduits with heated air having substantially equal pressure, a spraying device in each of the conduits connected with a source of the fluid to be desiccated, a screen, having a superficial area greater than the combined cross-sectional areas of the conduits, and means for withdrawing air from the chamber through the screen; said means being adapted to maintain a pressure in the chamber less than the pressure in the conduits.

5. In desiccating apparatus, conduits for heated air, means for discharging liquid to be desiccated in finely divided form into the air in the conduits, a separating chamber into which the conduits lead, an exhaust chamber communicating with the separating chamber at the bottom, means for exhausting air from the exhaust chamber, said means being of a capacity sufficient to maintain the air in the separating chamber at not greater than atmospheric pressure, and a screen between the exhaust chamber and the separating chamber having a superficial area greater than the cross-sectional area of the conduits leading into the separating chamber.

6. In desiccating apparatus, conduits for heated air, means for delivering air thereinto at a pressure above that of the atmosphere, means for discharging liquid to be desiccated in finely divided form into the air in the conduits, a separating chamber into which the conduits lead at the top, an exhaust chamber at the bottom of the separating chamber, means for exhausting air in the exhaust chamber, said means being of a capacity sufficient to maintain the air in the separating chamber at a pressure not greater than that of the atmosphere, a screen between the exhaust chamber and the separating chamber having a superficial area greater than the cross-sectional area of the heated air conduits, and means for intermittently jarring or shaking the screen to free it of desiccated material.

7. In desiccating apparatus, a plurality of conduits for heated air, means for delivering air thereinto at a pressure above that of the atmosphere, means for discharging liquid to be desiccated in finely divided form into the air of the conduits, a separating chamber into which the conduits lead on opposite sides at the top, means for exhausting air from the separating chamber at the bottom on opposite sides unoccupied by the heated air conduits, said means being of capacity sufficient to maintain the air in the separating chamber at a pressure not greater than that of the atmosphere, and a screen between each exhaust chamber and the separating chamber each having a superficial area greater than the cross-sectional area of the conduits leading into any one side of the separating chamber.

In testimony whereof, I, sign this specification in the presence of two witnesses.

CHARLES E. ROGERS.

Witnesses:
 RUBY L. COOK,
 CHARLES E. WISNER.